United States Patent [19]

Frank et al.

[11] Patent Number: 4,610,579
[45] Date of Patent: Sep. 9, 1986

[54] CORE DRILL BIT WITH DYNAMIC COOLING FLUID FLOW CONTROL MEANS

[75] Inventors: Robert G. Frank, Murrysville; Joseph A. Noca, Irwin, both of Pa.; Joseph B. Kelly, Crestline; Robert L. Bowers, Bellville, both of Ohio

[73] Assignee: PPG Industries, Inc., Pittsburgh, Pa.

[21] Appl. No.: 732,124

[22] Filed: May 9, 1985

Related U.S. Application Data

[63] Continuation-in-part of Ser. No. 615,975, May 31, 1984, Pat. No. 4,541,758.

[51] Int. Cl.[4] .................. B23B 51/04; B23B 51/06
[52] U.S. Cl. ............................. 408/60; 51/209 R; 125/20; 175/393; 408/68; 408/145; 408/206; 408/703

[58] Field of Search .............. 408/57, 59, 60, 204, 408/205, 206, 207, 703, 82, 84, 85, 145, 61, 203.5, 67, 68; 125/20; 51/209 R; 299/81; 175/330, 393

[56] References Cited

U.S. PATENT DOCUMENTS

| 2,569,854 | 10/1951 | Hatcher | 408/68 |
| 3,802,520 | 4/1974 | Whitman | 408/57 |
| 4,129,401 | 12/1978 | Berthier | 408/204 |
| 4,551,045 | 11/1985 | Bossler | 408/59 |

Primary Examiner—Frank T. Yost
Assistant Examiner—Hien H. Phan
Attorney, Agent, or Firm—Robert A. Westerlund, Jr.

[57] ABSTRACT

A bit for a core drill of the type for drilling a chamfered hole in an article has a dynamic cooling fluid flow directing element for cooling the bit and article surfaces during drilling and chamfering of the article.

20 Claims, 6 Drawing Figures

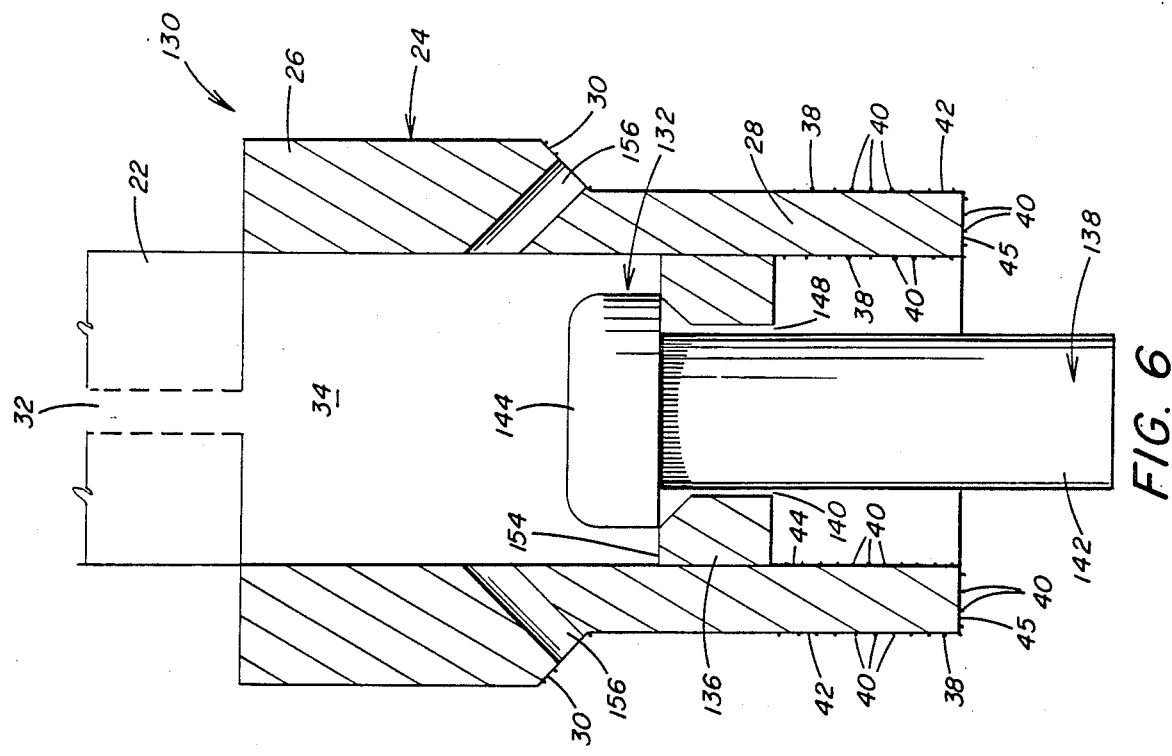
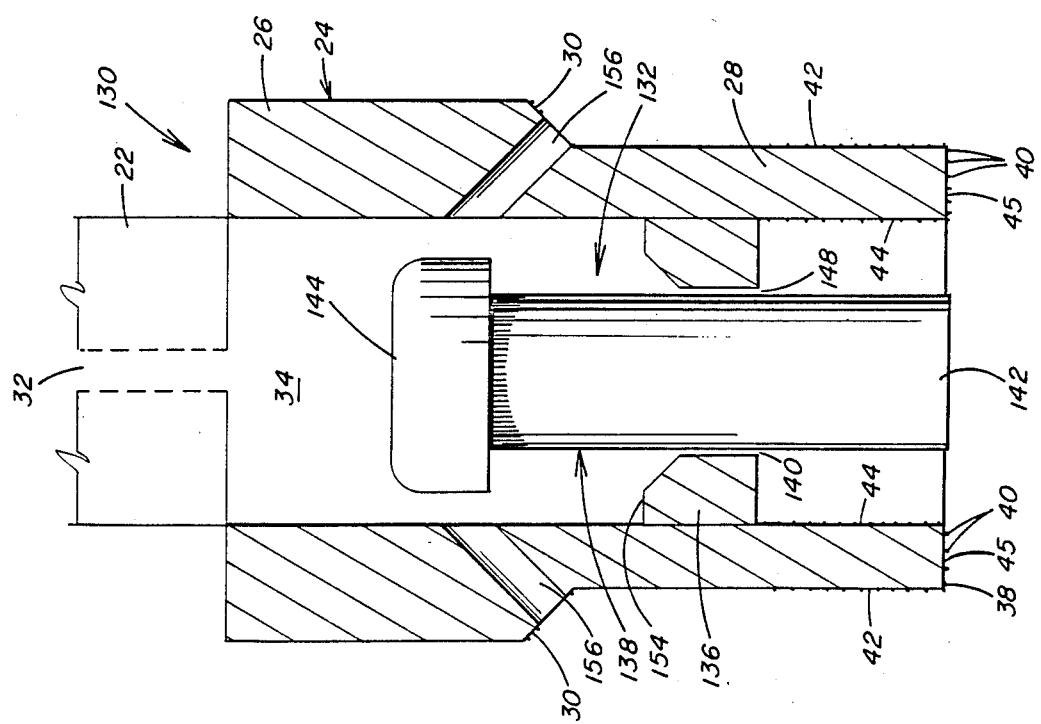

CORE DRILL BIT WITH DYNAMIC COOLING FLUID FLOW CONTROL MEANS

RELATED APPLICATION

This is a continuation-in-part application of U.S. patent application Ser. No. 615,975, filed on May 31, 1984 now U.S. Pat. No. 4,541,758 in the name of Robert G. Frank and Joseph A. Noca for MEANS AND METHOD FOR LUBRICATING CORE DRILLS, which teachings are herein incorporated by reference.

FIELD OF THE INVENTION

This invention relates to a core drill bit having a dynamic cooling fluid flow control means for cooling the bit and article surfaces during the drilling and chamfering of the article.

BACKGROUND OF THE INVENTION

It is conventional practice to drill holes through glass products, e.g., automotive lites, to prepare them for assembly line and other operations. The drilling process usually includes the steps of employing a bottom core drill to first drill from the bottom surface of the glass product to approximately the center thereof, and to then retract the bottom drill. Thereafter, a top core drill is employed to drill from the top surface of the glass product in direct alignment with the bottom drilled portion, to just beyond the terminal point of the bottom drilled portion, whereupon the glass core plug thus formed falls into a disposal bin, thereby creating a hole.

The type of drill usually used in the above-described glass drilling operation is a diamond core drill having a top, hollow shank portion and a downwardly extending generally cylindrical, hollow drilling portion provided with a matrix of diamond drilling elements disposed on both the inside and outside to provide inside and outside drilling surfaces. These core drills are commonly cooled during the drilling operation to counteract the heat generated by the friction occurring between the drilling surfaces and the surfaces of the glass product being drilled. As is appreciated by those skilled in the art, excessive heat and friction may cause cracks and other defects in the glass product being drilled, which defects weaken the structural integrity of the product.

One cooling technique includes directing a stream of lubricating fluid, usually water, downwardly through the bores of the shank portion and the drilling portion of the drill, to lubricate and cool the glass and drilling surfaces, to reduce the amount of friction and heat occurring therebetween. The above technique is acceptable for "straight hole" glass core drilling operations. However, the above technique is not acceptable for drilling chamfered or beveled holes due to loss of the lubricating/cooling fluid prior to the chamfering step. Chamfered, or beveled, holes are made using chamfering core drills. These drills usually include a top, hollow shank portion, a chamfering portion having a downwardly and inwardly extending chamfering surface, and a drilling portion extending downwardly from the inner termination point of the chamfering surface. The chamfering surface and inner and outer surfaces of the drilling portion are each provided with a matrix of diamond drilling elements.

The same procedural sequence as previously discussed for drilling a "straight hole" is employed to drill a chamfered hole with a chamfering core drill. The problem arises after the glass core plug has been removed, because the lubricating fluid which is directed downwardly through the bore of the drill escapes freely through the hole due to the absence of the glass core plug. Consequently, when the chamfering surface frictionally engages the upper edge periphery of the hole, there is little, if any, lubricating fluid available to cool the friction and heat generated. The result is usually defects in the surrounding region of the glass product, which can weaken the structural integrity thereof.

The above-referenced U.S. patent application Ser. No. 615,975 is acceptable for drilling a chamfered hole in an article without thermally damaging the article. However, it would be advantageous to provide alternate techniques for drilling a chamfered hole in an article without thermally damaging the article.

SUMMARY OF THE INVENTION

This invention relates to a bit for a core drill of the type for drilling a chamfered hole in an article. The bit includes a body having an inner bore, drilling surfaces, a chamfering surface, and an inner chamber disposed in fluid communication with the inner bore. Lubricating fluid flow directing facilities disposed in the bit body inner chamber have a dynamic component reciprocably movable between first and second positions. In the first position, the dynamic component is positioned to permit flow of a lubricating/cooling fluid from the inner bore to at least the article portion to be drilled and the drilling surfaces. In the second position, the dynamic component is positioned to permit flow of the lubricating/cooling fluid from the inner bore through at least one opening provided through the bit body to at least the article portion to be chamfered and the chamfering surface to at least minimize thermal damage to the article.

BRIEF DESCRIPTION OF THE DRAWINGS

FIG. 5 is a cross-sectional view of a chamfering core drill bit embodying features of an alternative embodiment of the present invention, showing the plunger element of the lubricating fluid flow directing means in its upper position.

FIG. 6 is the same view as FIG. 3, except that the plunger element is shown in its lower position.

DESCRIPTION OF THE INVENTION

Figure 1:
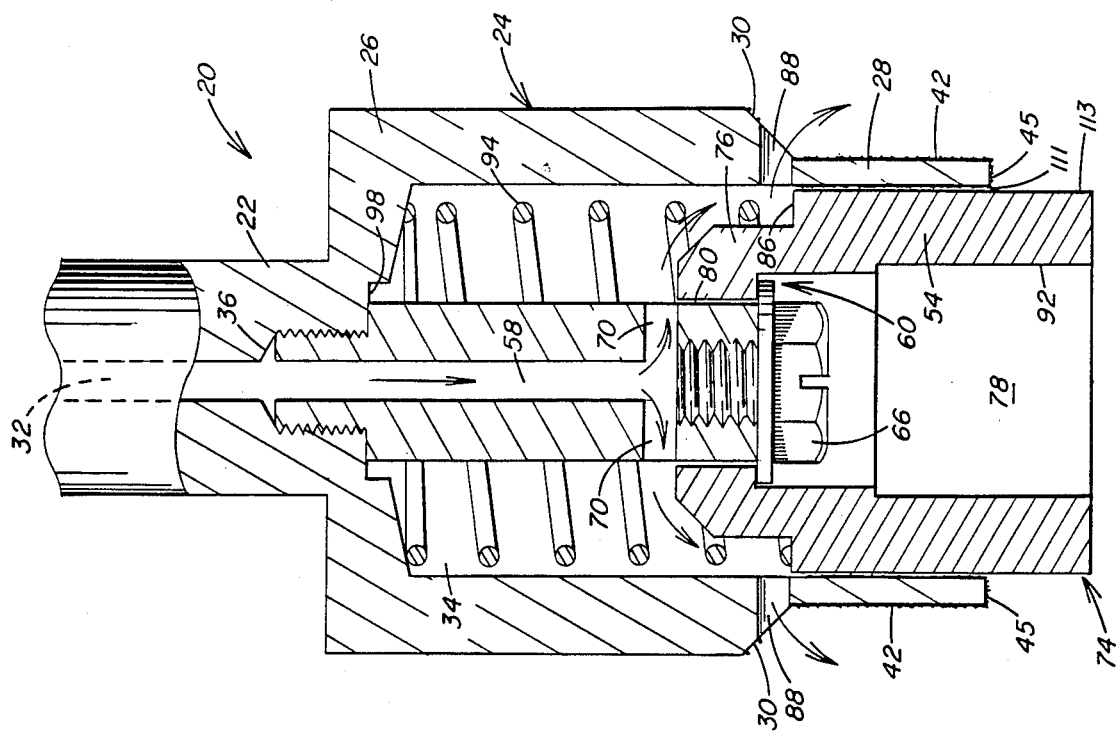
FIG. 1 is a cross-sectional view of a chamfering core drill bit embodying features of the present invention, showing the dynamic component of the lubricating fluid flow directing means in its upper position.
Figure 2:
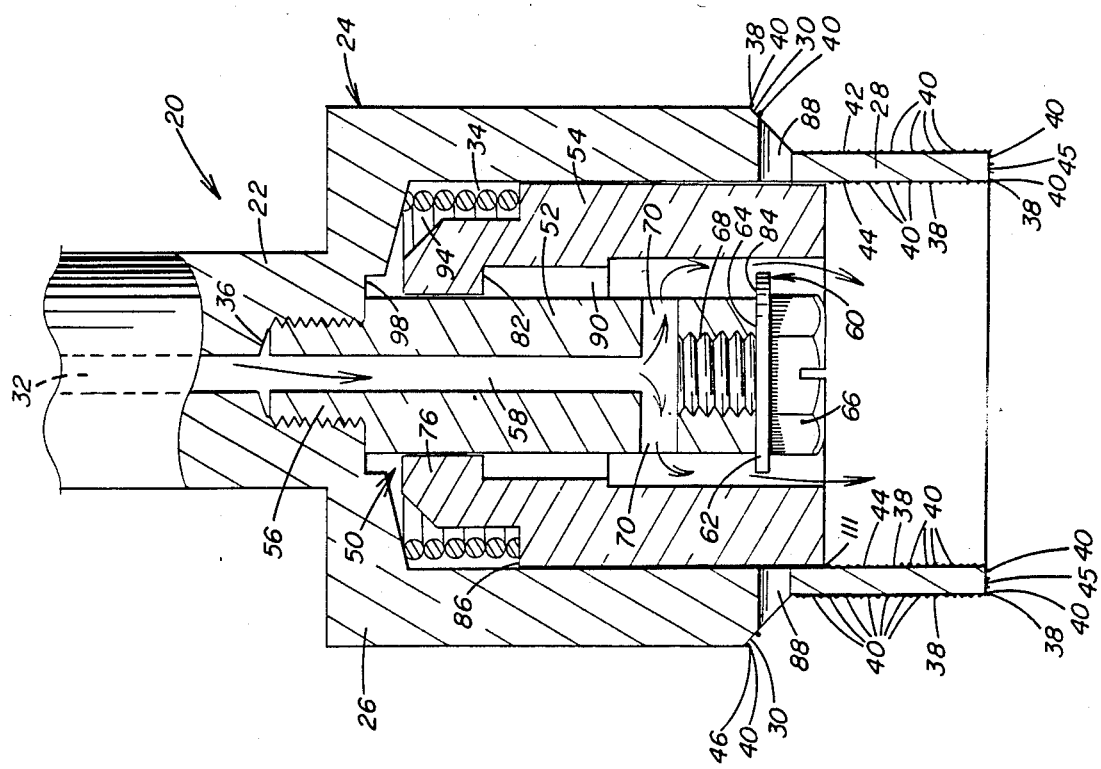
FIG. 2 is the same view as FIG. 1, except that the valve member is shown in its lower position.

Referring now to the drawings, and more particularly to FIGS. 1 and 2, there is shown a chamfering core drill bit 20 embodying features of this invention. The drill bit 20 includes an elongated shank portion 22 and a depending generally cylindrical bit body portion 24. The body portion 24 includes a generally cylindrical top portion 26 and a generally cylindrical bottom or drilling portion 28 having a lesser outside diameter than the top portion 26. The top portion 26 and the drilling portion 28 are interconnected by an inwardly sloped bevelled portion or chamfering surface 30. The shank portion 22 is provided with an inner, longitudinal bore 32 which fluidly communicates, at its upper end with a source of lubricating/cooling fluid, e.g. water, and which fluidly communicates, at its lower end, with internal chamber 34 of the bit body portion 24, via threaded bore 36. A matrix 38 of diamond drilling elements 40 is affixed to the outer, inner, and bottom surfaces of the drilling portion 28 to provide outer, inner, and bottom drilling surfaces 42, 44, 45 respectively. Another matrix 46 of diamond drilling elements 40 is affixed to the chamfering surface 30. As can be appreciated by those in the drilling art, neither the type, shape, contour, texture, configuration, etc. of the drilling elements 40 nor the manner of affixing them to the drilling and chamfering surfaces is limiting to the present invention. Further, the type of core drill bit employed and/or its specific construction are not limiting to the present invention.

Figure 3:
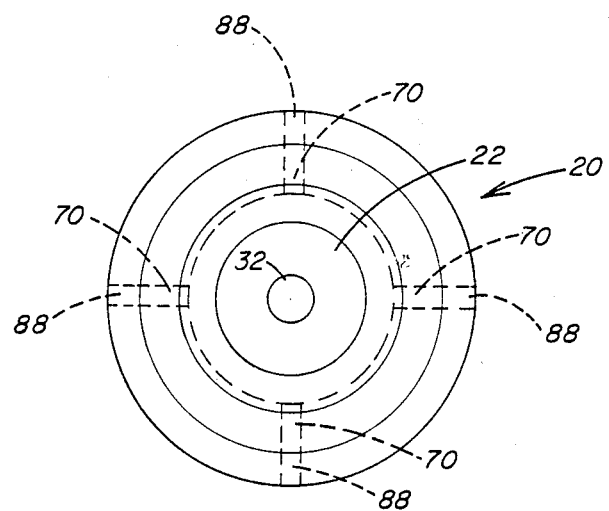
FIG. 3 is a plan view of the bit shown in FIGS. 1 and 2.

The discussion will now be directed to a dynamic lubricating fluid flow directing means embodying important aspects of the present invention. Referring still to FIGS. 1 and 2, there can be seen a preferred embodiment of the lubricating fluid flow directing means 50, wherein it is shown to comprise a center post 52 and a valve member 54. The center post 52 is conveniently attached to the bit body portion 24, e.g. by way of threaded shank portion 56 of the post 52 being threadedly connected to threaded bore 36. The center post 52 has an inner, longitudinal bore 58 preferably axially aligned with the inner, longitudinal bore 32 of the shank portion 22 of the bit 20. The inner bore 58 of the post 52 fluidly communicates at its upper end with the inner bore 32 of the shank portion 22, and is closed at its lower end. The center post 52 is further provided with a valve seat 60 at its lower end. The valve seat 60 suitably comprises a washer 62 held against the bottom face 64 of the center post 52 by a headed screw 66 threadedly connected to threaded bore 68 provided through the bottom of the post 52. The post 52 is also provided with at least one radial bore 70, e.g. and as shown in FIG. 3, four equally spaced radial bores 70 (i.e. disposed at 90° to each other), fluidly interconnecting the inner bore 58 of the post 52 with the internal chamber 34 of the bit body portion 24.

With continued reference to FIGS. 1 and 2, the valve member 54 is there shown to comprise a generally cylindrical member 74 having a head portion 76 and an internal chamber 78 open at its bottom end. The head portion 76 is provided with an axial bore 80 having a greater diameter than the outside diameter of the post 52 and a lesser diameter than the diameter of the washer 62, for mounting the valve member 54 on the post 52 for reciprocable movement between an upper or first position as shown in FIG. 1 and a lower or second position as shown in FIG. 2. In the lower position, the bottom surface 82 of the head portion 76 abuttingly engages the upper surface 84 of the washer 62. The outer surface of the member 74 is preferably provided with a circumferential shoulder 86 which is preferably aligned with at least one opening 88 provided through the chamfering surface 30 when the valve member 54 is in the lower position, for purposes which will hereinafter become apparent. In the preferred embodiment of this invention, four equally spaced openings 88 (i.e. disposed at 90° to each other) are provided through the chamfering surface 30 in alignment with the radial bores 70 as shown in FIG. 3. The outside diameter of the member 74 is preferably just slightly (for example, 0.05 inches (0.125 cm.)) less than the diameter of the internal chamber 34 of the bit body portion 24. Further, the diameter of the internal chamber 78 of the valve member 54 is slightly (e.g. 0.035 inches (0.09 cm.)) greater than the diameter of the washer 62 to provide an annular fluid flow passageway 90 between the outer circumferential surfaces of the post 52 and the washer 62, and the walls 92 of the internal chamber 78 of the valve member 54, when the valve member 54 is in its upper position. Further, the valve member 54 is preferably at least long enough to extend beyond the bottom drilling surface 45 by a distance greater than the depth of the head portion 76 when the valve member 54 is in its lower position shown in FIG. 2. Most preferably, the valve member 54 extends at least a distance beyond the bottom drilling surface 45 greater than the combined depth of a radial bore 70 and the head portion 76 when the valve member 54 is in its lower position. Yet further, a biasing means, e.g. a generally helical spring 94, e.g. a compression spring, is preferably disposed in the internal chamber 34 of the bit body portion 24 between the shoulder 86 of the valve member 54 and the top wall 98 of the internal chamber 34 for biasing the valve member 54 towards its lower position to decrease the response time necessary for the valve member 54 to move from the upper to the lower position.

Figure 4:
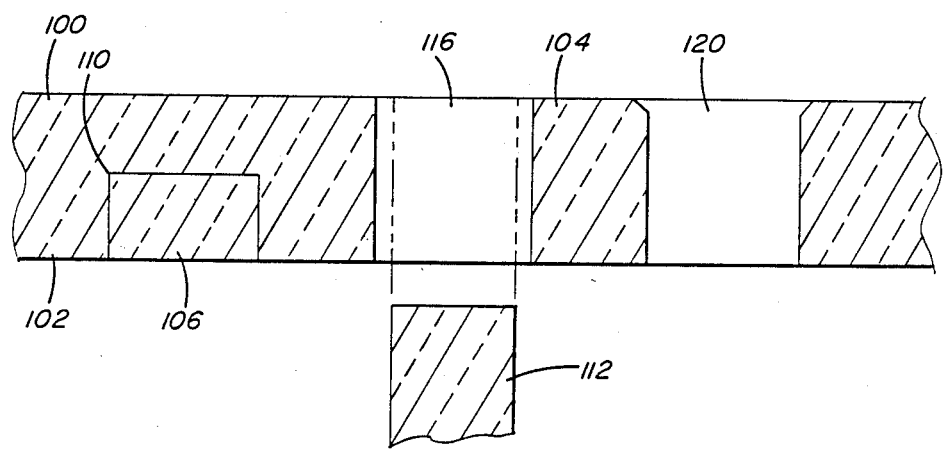
FIG. 4 is a cross-sectional view of a piece of glass showing sequential stages of a drilling and chamfering operation.

In order to facilitate an understanding of the operation of the drill bit 20 of this invention, its operation will be described in a typical application environment, wherein the shank portion 22 of the bit 20 is connected or chucked at its upper end to the drive spindle (not shown) of a core drill (not shown), e.g. of the type for drilling chamfered holes in a glass sheet, e.g. an automotive lite 100 (FIG. 4). However, the application of the present invention is not limited thereto, as the bit 20 may be used in conjunction with any type of core drill for drilling chamfered holes in any type of article.

With additional reference now to FIG. 4, a typical operation for drilling a chamfered hole in an automotive lite will now be discussed. The bottom surface 102 of the lite 100 is drilled in any convenient manner to a point 110 approximately halfway between the bottom surface 102 and the top surface 104 to provide a bottom drilled portion 106. A core drill (not shown) having the bit 20 operatively connected thereto is employed to drill the remainder of the way through the lite 100 from the top surface 104 to the point 110. More particularly, a drive source (not shown) rotatingly drives the core drill spindle (not shown) and the core drill bit 20 attached thereto downwardly to thereby rotate the drilling portion 28 of the bit 20 through the top surface 104 of the lite 100 to at least the point 110, in direct alignment with the bottom drilled portion 106, at which point, a glass core plug 112 falls from the lite 100 into any convenient disposal facility, e.g. a container (not shown), thereby providing a completed hole 116 through the lite 100. During the above-described drilling operation, a lubricating/cooling fluid e.g. water, is moved, preferably under high pressure (e.g. 50 psi), through the inner bore 32 of the shank portion 22 and the inner bore 58 of the center post 52. During the drilling step, the bottom surface of the valve member 54 engages the top surface 104 of the lite 100. As the drilling portion 28 is driven downwardly, the resistance offered by the lite 100 overcomes the downwardly directed biasing force of the spring 94 to progressively move the valve member 54 towards its upper position as shown in FIG. 1. The lubricating/cooling fluid is permitted to flow from the inner bore 58 of the center post 52, through the radial bores 70 of the post 52, and thenceforth downwardly through the fluid flow passageway 90 to at least the portion of the lite 100 being drilled and the inner drilling surface 44 to minimize the heat caused by the friction generated by the rotational, frictional engagement of the drilling surfaces with the glass surfaces, to thereby minimize thermal damage to the lite 100. Further, due to the large rotational forces of drilling, centrifugal force is generated which causes a portion of the lubricating/cooling fluid to follow a capillary path along the inner drilling surface 44, then between the glass portion being drilled and the bottom drilling surface 45, and finally, between the outer drilling surface 42 and the glass portion being drilled, to thereby also directly cool the bottom and outer drilling surfaces 45, 42, respectively. Alternatively, if the outside diameter of the member 74 is made to be somewhat less than the diameter of the internal chamber 34 of the bit body portion 24, then the annular passageway 111 between the inner drilling surface 44 and the outside surface 113 of the member 74 will be large enough to allow backflow of a portion of the cooling fluid through the openings 88 and between the outer drilling surface 42 and the glass portion being drilled. As the glass core plug 112 falls from the lite 100, the valve member 54 is forced by gravity, fluid downflow pressure, and the downward biasing force of the spring 94 from its upper position shown in FIG. 1 to its lower position shown in FIG. 2, whereby the bottom surface 82 of the head portion 76 of the valve member 54 abuttingly, seatingly engages the upper surface 84 of the washer 62. The chamfering operation then ensures, with the chamfering surface 30 rotationally, cuttingly engaging the upper edge periphery of the hole 116, thereby providing a chamfered hole 120 as shown on the right side of FIG. 4. During the above-described chamfering step, the lubricating/cooling fluid is permitted to flow from the inner bore 58 of the center post 52, through the radial bores 70 of the post 52, over the upper surface of the valve member 54 and thenceforth outwardly through the openings 88 to at least the portion of the lite 100 being chamfered and the chamfering surface 30 to at least minimize thermal damage to the lite 100 which may otherwise be occasioned by the chamfering step. The shoulder 86 of the member 74 and a circumferential bevel or chamber 124 provided around the outer periphereal upper surface of the head portion 76 of the valve member 54, along with the centrifugal forces of rotation of the bit 20 ensure that the lubricating/cooling fluid is accurately directed to the chamfering surface 30 and the portion of the lite 100 being chamfered. The shoulder 86 substantially prohibits downward flow and escape of the fluid through the hole 116.

Referring now to FIGS. 5 and 6, there can be seen an alternative embodiment of the core drill bit of this invention, wherein the core drill bit 130 is suitably constructed similarly or identical to the core drill bit 20 of the preferred embodiment of this invention, except for the lubricating fluid flow directing means aspect thereof. The fluid flow directing means 132 of the alternative embodiment of this invention comprises a valve assembly having a valve seat 136 and a valve or plunger element 138. The valve seat 136 comprises a generally cylindrical member attached to the walls of the bit body portion forming the internal chamber 34. The valve seat 136 is provided with a longitudinal opening 140 in which shaft portion 142 of the plunger element 138 is reciprocably mounted. The plunger element 138 also has a head portion 144 having a larger diameter than the diameter of the opening 140. The diameter of the shaft portion 142 of the plunger element 138 is less (e.g. 0.05 inches (0.128 cm.) less) than the diameter of the opening 140 to provide an annular fluid flow passageway 148 between the outside surface of the shaft portion 142 and the walls forming the opening 140. Further, the shaft portion 142 of the plunger element 138 is preferably at least long enough to extend beyond the bottom drilling surface 45 when the plunger element 138 is in its lower position shown in FIG. 6, wherein the bottom surface 152 of the head portion 144 abuttingly, seatingly engages the top surface 154 of the valve seat 136. In operation, the core drill bit 130 is operatively connected to the drive spindle (not shown) of a core drill (not shown), e.g. of the type described in conjunction with the preferred embodiment of the invention. The drilling and chamfering operations are performed in the same manner as hereinbefore described in conjunction with the preferred embodiment. As the drilling portion 28 of the bit 130 is rotatingly driven downwardly through the lite 100, the plunger element 138 is forced upwardly by contact with the top surface 104 of the lite 100 towards the upper position shown in FIG. 5, thereby enabling the lubricating/cooling fluid, e.g. water, to flow downwardly from the inner bore 32 of the shank portion 22 of the bit 130, through the annular passageway 148 to at least the portion of the lite 100 being drilled and the inner drilling surface 44, to at least minimize thermal damage to the lite 100 which may otherwise occur due to the heat and friction generated during the drilling operation. Further, due to the large rotational forces of drilling, centrifugal force is generated which causes a portion of the lubricating/cooling fluid to follow a capillary path along the inner drilling surface 44, then between the glass portion being drilled and the bottom drilling surface 45, and finally, between the outer drilling surface 42 and the glass portion being drilled, to thereby also directly cool the bottom and outer drilling surfaces 45, 42, respectively. Also, it is believed, a portion of the cooling fluid is caused by backflow to pass through the annular passageway 148 and by splashing and centrifugal drilling forces through the openings 156 and between the outer drilling surface 42 and the glass portion being drilled. After the glass core plug 112 falls from the lite 100, gravity, fluid downflow pressure, and preferably, a downwardly acting biasing means, e.g. a spring (not shown), quickly act to move the plunger element 138 into its lower position shown in FIG. 6, whereby fluid flow through the annular passageway 148 is prohibited by the seated head portion 144 of the plunger element 138, the cooling fluid passing instead through angled openings 156 provided through the chamfering surface 30 of the bit 130 to at least the article portion being chamfered and the chamfering surface 30 to minimize thermal damage to the lite 100.

Various modifications and variations of the basic inventive concepts herein taught may appear to those engaged in the pertinent art without departing from the spirit and scope of this invention, which should be interpreted solely on the basis of the following claims.

What is claimed is:

1. A bit for a core drill of the type for drilling a chamfered hole in an article, comprising:
 a body having an inner bore, drilling surfaces, a chamfering surface, at least one radial opening, and an inner chamber disposed in fluid communication with said inner bore;

a lubricating fluid flow directing means disposed within said inner chamber and having a dynamic component reciprocably movable between first and second positions;

wherein in said first position said dynamic component is positioned to permit flow of a lubricating/cooling fluid from said inner bore to at least the article portion to be drilled and said drilling surfaces; and wherein in said second position said dynamic component is positioned to permit flow of the lubricating/cooling fluid from said inner bore through said at least one opening provided through said bit body to at least the article portion to be chamfered and said chamfering surface to at least minimize thermal damage to the article.

2. The bit as set forth in claim 1, wherein said lubricating fluid flow directing means comprises:

a post having a first end portion connected to said bit body, a second end portion provided with a valve seat, and an inner bore disposed in fluid communication with said inner bore of said bit body; and said dynamic component comprising a valve member reciprocably movable along said post between said first position and said second position.

3. The bit as set forth in claim 2, wherein said post further comprises at least one radial bore fluidly interconnecting said inner bore of said post with said body inner chamber, and wherein further, said valve member, when in said first position, will permit flow of the lubricating/cooling fluid from said at least one radial bore to at least the article portion to be drilled and said drilling surfaces, and when in said second position, will permit flow of the lubricating/cooling fluid from said at least one radial bore and through said at least one bit body opening to at least the article portion to be chamfered and said chamfering surface.

4. The bit as set forth in claim 3, wherein said valve member comprises a head portion and an internal chamber disposed in fluid communication with said body inner chamber, and wherein further, said head portion is provided with a longitudinal bore mounting said valve member on said post, the diameter of said longitudinal bore being greater than the outside diameter of said post and less than the diameter of said valve seat, wherein said head portion seatingly engages said valve seat when said valve member is in its second position.

5. The bit as set forth in claim 4, wherein the end of said inner bore of said post adjacent said second end portion of said post is closed.

6. The bit as set forth in claim 5, wherein the diameter of said internal chamber of said valve member is greater than the outside diameter of said post to provide a passageway between the outer surface of said post and the walls forming said valve member internal chamber, so that when said valve member is in its first position, the lubricating/cooling fluid will be permitted to flow from said at least one radial bore of said post and through said passageway to at least the article portion to be drilled and said drilling surfaces.

7. The bit as set forth in claim 6, wherein the depth of said head portion is selected so that when said valve member is in its second position, the lubricating/cooling fluid will be permitted to flow from said at least one post radial bore, over outer surface portions of said valve member and through said at least one bit body radial opening.

8. The bit as set forth in claim 7, wherein said valve member further comprises an outer surface shoulder for substantially blocking flow of the lubricating/cooling fluid through said inner chamber of said bit body and for permitting the lubricating/cooling fluid to flow thereover and through said at least one bit body opening, when said valve member is in its second position.

9. The bit as set forth in claim 8, wherein said at least one radial bore comprises at least one pair of oppositely disposed radial bores, and wherein further, said bit body radial opening comprises a corresponding number of oppositely disposed radial openings.

10. The bit as set forth in claim 9, wherein said radial bores and said radial openings are aligned.

11. The bit as set forth in claim 10, wherein said valve seat comprises a flange provided at said second end portion of said post.

12. The bit as set forth in claim 1, wherein said lubricating fluid flow directing means is removably connected to said bit body.

13. The bit as set forth in claim 1, wherein the core drill comprises a diamond core drill for drilling glass articles.

14. The bit as set forth in claim 13, wherein said glass articles comprise automotive lites.

15. The bit as set forth in claim 10, wherein said radial openings comprise passageways provided through said chamfering surface.

16. The bit as set forth in claim 15, wherein said valve member outer surface shoulder is aligned with said chamfering surface passageways.

17. The bit as set forth in claim 1, wherein said lubricating fluid flow directing means comprises:

a valve seat having a longitudinal opening fluidly interconnecting a first portion of said bit body inner chamber disposed on one side of said valve seat and a second portion of said bit body inner chamber disposed on the other side of said valve seat; and said dynamic component comprised of a valve member reciprocably movable between said first position and said second position.

18. The bit as set forth in claim 17, wherein said valve seat is attached to the walls forming said bit body inner chamber.

19. The bit as set forth in claim 18, wherein said valve member comprises a plunger element having a longitudinally elongated shaft portion extending into said longitudinal passageway of said valve seat and a head portion attached to said shaft portion, and wherein further, the diameter of said shaft portion is less than the diameter of said valve seat longitudinal passageway and the diameter of said head portion is greater than the diameter of said longitudinal passageway, so that when said plunger element is in said first position the lubricating/cooling fluid is allowed to flow between the outer surface of said shaft portion and the walls forming said longitudinal passageway to at least the article portion to be drilled and said drilling surfaces, and when said plunger element is in said second position, said head portion seatingly engages said valve seat to prohibit flow of the lubricating/cooling fluid through said longitudinal passageway and to allow the lubricating/cooling fluid to flow over surface portions of said valve seat and through said at least one bit body radial opening to at least the article portion to be chamfered and said chamfering surface.

20. The bit as set forth in claim 2, wherein it further comprises a means for biasing said valve member towards said second position.

* * * * *